US 9,523,969 B2

(12) United States Patent
Thakur et al.

(10) Patent No.: US 9,523,969 B2
(45) Date of Patent: Dec. 20, 2016

(54) SYSTEMS AND METHODS FOR TRACKING THE QUALITY AND EFFICIENCY OF MACHINE INSTRUCTIONS FOR OPERATING AN ASSOCIATED CONTROLLER

(71) Applicant: General Electric Company, Schenectady, NY (US)

(72) Inventors: Pavan Kumar Singh Thakur, Hyderabad (IN); Nagesh Laxminarayana Kurella, Hyderabad (IN); Chandrakanth Alahari, Hyderabad (IN); Maruthi Manohar Jupudi, Hyderabad (IN)

(73) Assignee: General Electric Company, Schenectady, NY (US)

( * ) Notice: Subject to any disclaimer, the term of this patent is extended or adjusted under 35 U.S.C. 154(b) by 558 days.

(21) Appl. No.: 13/771,924

(22) Filed: Feb. 20, 2013

(65) Prior Publication Data
US 2014/0236315 A1 Aug. 21, 2014

(51) Int. Cl.
*G06F 19/00* (2011.01)
*G05B 13/02* (2006.01)

(52) U.S. Cl.
CPC .................. *G05B 13/021* (2013.01)

(58) Field of Classification Search
USPC ........ 700/19, 17, 283, 83, 290, 86; 705/412, 705/37, 26; 702/22, 62, 119
See application file for complete search history.

(56) References Cited

U.S. PATENT DOCUMENTS

| 6,112,126 | A * | 8/2000 | Hales ................... G05B 13/029 700/28 |
| 6,556,950 | B1 * | 4/2003 | Schwenke et al. ........... 702/183 |
| 7,752,511 | B2 * | 7/2010 | Fulton .................. G05B 19/058 714/725 |
| 8,108,852 | B2 | 1/2012 | Petig et al. |
| 8,575,583 | B2 * | 11/2013 | Otsuka ................ H01L 27/2436 257/2 |
| 8,855,791 | B2 * | 10/2014 | Chand .................... G06Q 10/10 700/17 |
| 2003/0158795 | A1 * | 8/2003 | Markham et al. ............... 705/28 |
| 2004/0059881 | A1 * | 3/2004 | Carr ..................... G06F 13/1626 711/158 |
| 2004/0073404 | A1 * | 4/2004 | Brooks et al. ................. 702/183 |
| 2007/0050660 | A1 * | 3/2007 | Ferren ................. G06F 11/1407 714/1 |
| 2009/0132853 | A1 * | 5/2009 | Ferren ................. G06F 11/0721 714/19 |

(Continued)

FOREIGN PATENT DOCUMENTS

EP 2169547 A1 3/2010

*Primary Examiner* — Kidest Bahta
(74) *Attorney, Agent, or Firm* — Sutherland Asbill & Brennan LLP

(57) ABSTRACT

Certain embodiments of the disclosure may include systems and methods for tracking the quality and efficiency of the machine instructions to operate an associated controller. The method may include: receiving, by at least one processor, a plurality of rules associated with an optimization procedure for a plurality of machine instructions for operating an associated controller; determining an evaluation, by the at least one processor, for the plurality of machine instructions based at least in part on the plurality of rules; and outputting the evaluation.

19 Claims, 2 Drawing Sheets

(56) References Cited

U.S. PATENT DOCUMENTS

| | | |
|---|---|---|
| 2010/0185336 A1* | 7/2010 | Rovnyak et al. ............ 700/287 |
| 2010/0318818 A1* | 12/2010 | Mangione-Smith .. G06F 1/3203 713/300 |
| 2011/0007889 A1* | 1/2011 | Geffen et al. ............ 379/265.06 |
| 2011/0271266 A1 | 11/2011 | Kreft et al. |

* cited by examiner

SYSTEMS AND METHODS FOR TRACKING
THE QUALITY AND EFFICIENCY OF
MACHINE INSTRUCTIONS FOR
OPERATING AN ASSOCIATED
CONTROLLER

TECHNICAL FIELD

This disclosure generally relates to machine instructions for operating an associated controller and in particular to systems and methods for tracking the quality and efficiency of the machine instructions for operating an associated controller.

BACKGROUND

Control system configuration and monitoring software suites may have sophisticated software modules to create application machine instructions. These instructions may be configured to operate and manage equipment of a plant for example. The instructions may be either hardcoded onto a controller of the equipment or downloaded using a software interface. However, currently, there is no automated feature available for analyzing the robustness, quality, or efficiency of these instructions.

BRIEF DESCRIPTION OF THE DISCLOSURE

Some or all of the above needs may be addressed by certain embodiments of the disclosure. According to an example embodiment, there is disclosed a method for tracking the quality and efficiency of machine instructions for operating an associated controller. The method may include receiving, by at least one processor, a plurality of rules associated with an optimization procedure for a plurality of machine instructions for operating an associated controller; determining an evaluation, by the at least one processor, for the plurality of machine instructions based at least in part on the plurality of rules; and outputting the evaluation.

According to another example embodiment, a system can be provided for tracking the quality and efficiency of machine instructions for operating an associated controller. The system may include at least one processor configured with a code tracker module, a rules repository module, a code analyzer module, and an output device. The code tracker module may store a plurality of machine instructions associated with a controller. The rules repository module may contain a plurality of rules associated with an optimization procedure. The code analyzer module may be configured to determine an evaluation for the plurality of machine instructions based at least in part on the plurality of rules. The output device may be configured to output the evaluation of the display.

According to yet another embodiment, one or more computer-readable media can be provided. The computer-readable media can store computer-executable instructions that, when executed by at least one processor, configure at least one processor to perform certain operations. The operations may include: receiving, by a computing device configured with at least one processor, a plurality of rules associated with an optimization procedure for a plurality of machine instructions associated with a controller; determining an evaluation, by the computing device configured with at least one processor, for the plurality of machine instructions based at least in part on the plurality of rules; and outputting the evaluation.

Other embodiments, features, and aspects of the disclosure are described in detail herein and are considered a part of the claimed disclosure. Other embodiments, features, and aspects can be understood with reference to the following detailed description, accompanying drawings, and claims.

BRIEF DESCRIPTION OF THE FIGURES

References will now be made to the accompanying figures, which are not necessarily drawn to scale, and wherein.

DETAILED DESCRIPTION OF THE FIGURES

Figure 1:
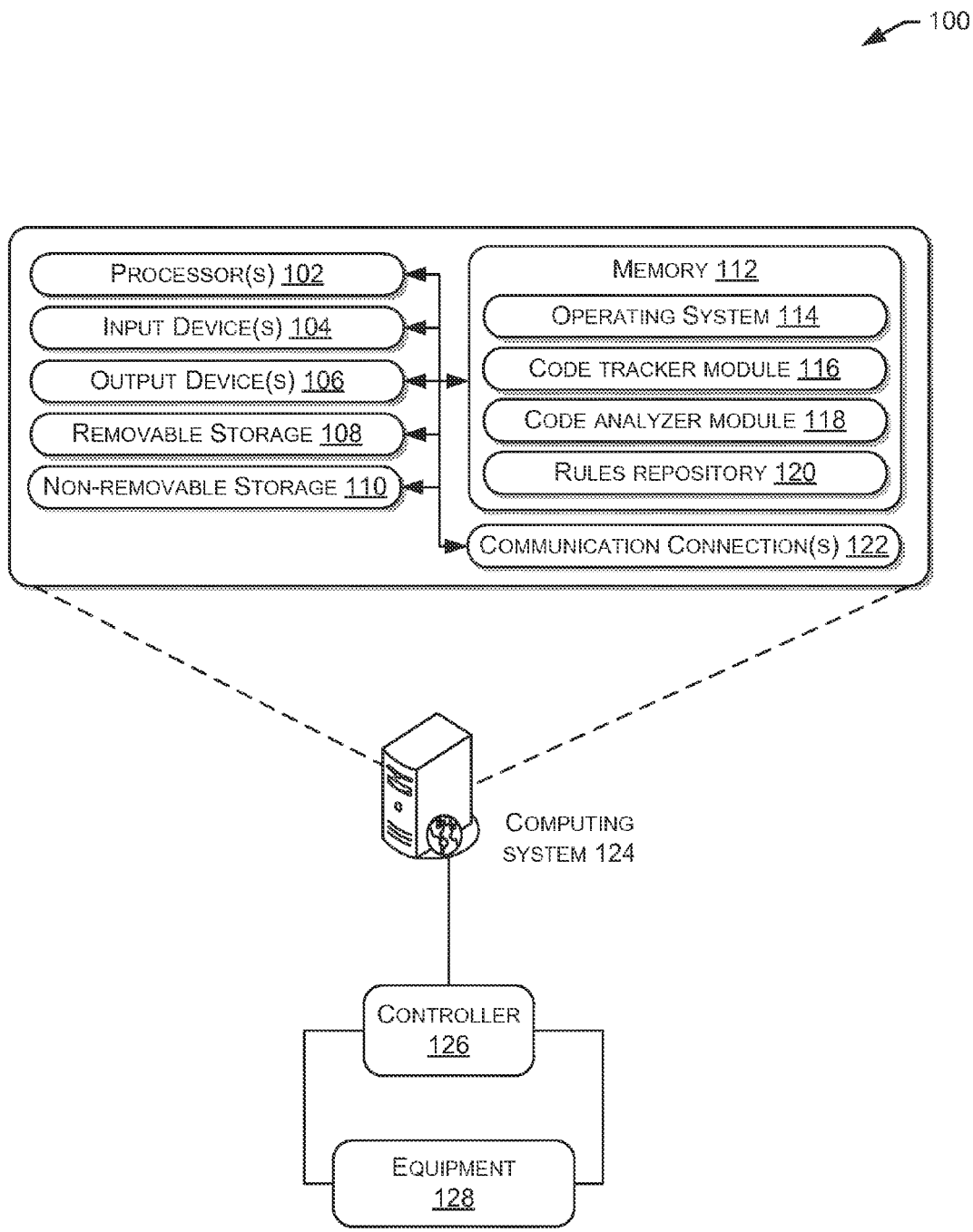
FIG. 1 is a schematic block diagram of an exemplary system architecture for implementing systems and methods for tracking the quality and efficiency of the machine instructions for operating an associated controller, according to at least some embodiments of the disclosure.

Example embodiments of the disclosure now will be described more fully hereinafter with reference to the accompanying drawings, in which some, but not all embodiments are shown. Indeed, the disclosure may be embodied in many different forms and should not be construed as limited to the embodiments set forth herein; rather these embodiments are provided so that this disclosure will satisfy applicable legal requirements. Like numbers refer to like elements throughout.

As an overview, configuring or creating a controller for equipment is a relatively complex task because of the large number of systems and tools that may need to be synchronized. Currently, many software tools and programming environments are available to aid in creating and configuring a controller. In certain examples, some tools may contain libraries with reusable logic blocks to perform certain functions that may be used on many different controllers. The reusable logic blocks may represent software or hardware logic blocks. The reusable logic blocks may be presented to a programmer in a graphical format or a visual representation, where the programmer may use the various logic blocks. However, these tools and environments may not be able to identify or determine the accuracy and efficiency of the instructions to operate a controller.

In order to identify the accuracy and efficiency of the instructions, one can populate a rules repository with best practices and standards as rules. The instructions may then be analyzed by validating them against the rules. The output of this analysis may include, but is not limited to, warnings or recommendations that might identify certain instructions that may be deviating from best practices and coding standards.

Therefore, according to at least one embodiment of the system, there is disclosed a method, wherein the method may include receiving, by at least one processor, a plurality of rules associated with an optimization procedure for a plurality of machine instructions for operating an associated controller. The machine instructions may further comprise a plurality of the input and output values associated with the operation procedure for the controller. The plurality of machine instructions may comprise one or more logic blocks associated with the operation procedure for the controller. The method may further include categorizing the plurality of rules into one or more categories The method may further include determining an evaluation, by the at least one processor, for the plurality of machine instructions for operating the associated controller based at least in part on the plurality of rules, and outputting the evaluation. Determining an evaluation may also comprise determining one or more optimized machine instructions. Further, the evaluation may comprise outputting one or more warnings associated with the optimization procedure to a display component. The evaluation may further comprise outputting a recommended plurality of machine instructions to a display.

According to at least one embodiment of the disclosure, there is disclosed a system that includes at least one processor. The processor may be configured with at least a code tracker module, a rules repository module, and a code analyzer module. The code tracker module may be configured to store a plurality of machine instructions associated with a controller. The rules repository module may contain a plurality of rules associated with an optimization procedure for the controller. The rules repository module may further comprise a plurality of categories wherein each of the plurality of rules is associated with one of the plurality of categories. The code analyzer module may be configured to determine an evaluation for the plurality of machine instructions based at least in part on the plurality of rules and an output device configured to output the evaluation to a display. The plurality of machine instructions may further include one or more logic blocks associated with an operation procedure for the controller or input/output values associated with an operation procedure for the controller. The evaluation may comprise one or more warnings associated with the optimization procedure or may comprise a recommended plurality of machine instructions. The evaluation may also be one or more optimized machine instructions for at least one of the plurality of machine instructions.

According to at least one embodiment of the disclosure, there is disclosed one or more computer-readable media storing computer-executable instructions that, when executed by at least one processor, configure the at least one processor to perform operations. The operations may include receiving, by a computing device configured with at least one processor, a plurality of rules associated with an optimization procedure for a plurality of machine instructions associated with a controller; determining an evaluation, by the computing device configured with at least one processor, for the plurality of machine instructions associated with a controller based at least in part on the plurality of rules; and outputting the evaluation.

FIG. 1 depicts an exemplary computing system that may facilitate improvements in the quality and efficiency of the machine instructions for operating an associated controller, according to at least one embodiment of the disclosure. As shown in FIG. 1, a computing system 124 may communicate with a controller 126 operable to control the operations of industrial equipment 128. The equipment 128 may be any asset or device used to provide industrial processing capability. Further, the equipment 128 may be a generator or a turbine. The controller 126 may be implemented as appropriate in hardware, software, firmware, or combinations thereof. Software or firmware implementations of the controller 126 may include computer-executable or machine-executable instructions written in any suitable programming language to perform the various functions described. According to certain embodiments, a direct communication connection may exist between the devices. For example, the computing system 124 may be directly connected to the equipment 128 and the controller 126. Alternatively, the computing system 124 may be communicatively coupled with the equipment 128. The computing system 124, via one or more software programs or modules described in greater detail below, may perform a number of functions to implement or facilitate the processes described herein. For example, the computing system 124 may monitor and analyze machine instructions created to configure a controller based on available rules and may output recommendations based on the available rules.

The computing system 124 may include one or more computing devices, which may include, but are not limited to, a processor 102 capable of communicating with a memory 112. The processor 102 may be implemented as appropriate in hardware, software, firmware, or combinations thereof. Software or firmware implementations of the processor 102 may include computer-executable or machine-executable instructions written in any suitable programming language to perform the various functions described.

A memory 112 may store program instructions that are loadable and executable on the processor 102, as well as data generated during the execution of these programs. Depending on the configuration and type of computing system 124, a memory 112 may be volatile (such as random access memory (RAM)) and/or non-volatile (such as read-only memory (ROM), flash memory, etc.). In some embodiments, the computing system 124 may also include additional removable storage 108 and/or non-removable storage 110 including, but not limited to, magnetic storage, optical disks, and/or tape storage. The disk drives and their associated computer-readable media may provide non-volatile storage of computer-readable instructions, data structures, program modules, and other data for the devices. In some implementations, the memory 112 may include multiple different types of memory, such as static random access memory (SRAM), dynamic random access memory (DRAM), or ROM.

The memory 112, the removable storage 108, and the non-removable storage 110 are all examples of computer-readable storage media. For example, computer-readable storage media may include volatile and non-volatile, removable and non-removable media implemented in any method or technology for storage of information such as computer-readable instructions, data structures, program modules, or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVDs) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

The computing system 124 may also contain one or more communication connections 122 that allow the devices to communicate with devices or equipment capable of communicating with a computing device. The connections can be established via various data communication channels or ports, such as USB or COM ports, to receive connections for cables connecting the devices, e.g., control devices, to various other devices in an IO network. Devices on the IO network can include communication drivers such as Ethernet drivers that enable the devices to communicate with other devices on the IO network. According to various embodiments, the communication connections 124 may be established via a wired and/or wireless connection on the IO network. The computing system 122 may also include one or more input devices 104, such as a keyboard, a mouse, a pen, a voice input device, and a touch input device. The computing system 124 may also include one or more output devices 106, such as a display, a printer, and speakers.

In other embodiments, however, computer-readable communication media may include computer-readable instructions, program modules, or other data transmitted within a data signal, such as a carrier wave, or other transmission. As used herein, however, computer-readable storage media does not include computer-readable communication media.

Turning to the contents of the memory 110, the memory 110 may include, but is not limited to, an operating system (OS) 116 and one or more application programs or modules for implementing the features and aspects disclosed herein.

Further, the memory 112 may contain a rules repository 120. The rules repository 120 may contain data files indicating rules which are to be used in the evaluation of the instructions for the controller. The rules repository 120 may include pre-defined rules and may also include rules customized by the user by transmitting or uploading them into the rules repository 120. In some embodiments, there may be a user interface designed to allow the user to upload these rules into the repository. The rules may also be identified through detecting common errors in the creation of the machine instructions. For example, if a certain process is known to cause errors when interacting with other processes, a rule may be implemented to detect this process and either transmit an alert indicating that the process is problematic or alternatively, change the instructions to overcome the error.

In another example, a rule may be implemented to check the application instruction sequence for errors based on the execution order. The system might then recommend re-assigning the execution order based on a logical sequence to ensure that the total application logic is maintained in the correct flow. For example, if a process B is dependent upon the output of the process A for its input, the logical sequence would be to execute the process B only after the output value of A becomes available.

In addition to detecting errors, the rules may also be utilized to optimize the instructions. The rules may identify particular patterns of machine instructions and replace them with an optimized version of the machine instructions. Further, the rules may be implemented to improve the maintainability, reusability, efficiency or the instructions. For example, optimized instructions may be better able to isolate defects and make suture maintenance and upgrades easier.

In some examples, a rule may be implemented to reassign he execution order of a process or sub-processes from sequential to parallel. For example, if a process A accepts only inputs of X and Y, and the process B also accepts identical inputs (X and Y), then the output of process B is not dependent upon process A. In this situation, the rules that are implemented may recommend changing the execution order of B to execute parallel to A, thereby decreasing the execution-time of the instructions.

Another example of an optimization rule that be to embed instructions that are generated using multiple blocks into single blocks. For example, two logic blocks may give the same output for every input, but they may be different execution time based on their components. For example, the logic block representing the equation $(\overline{X+Y})$ x and $(X+Y)(\overline{XY})$ output the same output value for every possible input. However, the second logic block has a faster execution time. In this situation, the recommendation may be to embed the second block and optimize the control logic.

The rules may include a check which counted the usage of the data variables when executed on a portion of code and a criterion for compliance with the rule which specified the usage of these variables. The rules may for example identify inputs and outputs from certain subsystems and determine the interaction with other subsystems.

In some embodiments, the rules may have identifiers or limiters limiting their usage or utilization to a particular project or equipment. For example, if a rule is specifically optimizes the execution of machine instructions for function A, the rule may not be relevant or useful with regards to function B. Rules may also be assigned to particular phases of projects. In other embodiments, certain rules may only be used during the deployment phase of a project. In such cases, there may be prompts or series of interactive inputs for managing the evaluation of the instructions. These prompts may also assist a user in selecting applicable rules for their particular project, phase or use case.

The rules may be linked across many projects and a plurality of databases. The rules may also be generated following a user selection of a particular project, phase, company, developer, or category from a menu. In this case, the user may select groups of rules from the list, and alternatively or additionally, individual rules.

The code tracker module 116 may be configured to receive instructions for operating an associated controller. The code tracker module 116 may identify various logic blocks created or used for a particular design. The code tracker module 116 may be used either in real-time or during compilation of the instructions. The code tracker module 116 may process the instructions to provide data for analysis. The data may further classify the instructions for the associated controller with respect to various projects, instruction types, or categories. Further, the code tracker module 116 may provide a table or an xml file with information identifying the instructions for the associated controller 126.

Further, turning to the contents of the memory 112, the code analyzer module 118 may be used to optimize the machine instructions for the operation of a controller as developed, created, or generated by the programmers. The code analyzer module 118 may access rules from the rules repository 120. The code analyzer module 118 may apply the rules retrieved from the rules repository 120 to the instructions to detect violations of the rules. If violations of the rules are found, violations may be stored in a violations database. References are made to block diagrams of systems, methods and computer program products according to example embodiments of the disclosure. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of the blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor-based or programmable consumer electronics, mini-computers, main computers, etc.

Application programs that are components of the systems and methods described herein may include routines, programs, components, data structures, etc., that implements certain abstract data types and perform certain tasks or actions. In a distributed computing environment, the application program (in whole or in part) may be located in local memory or in other storage. In addition, or in the alternative, the application program (in whole or in part) may be located in remote memory or in storage to allow for circumstances where tasks are performed by remote processing devices through a communication network.

The example system shown in FIG. 1 is provided by way of example only. Numerous other operating environments, system architectures, and device configurations are possible. Accordingly, embodiments of the present disclosure should not be construed as being limited to any particular operating environment, system architecture, or device configuration.

Figure 2:
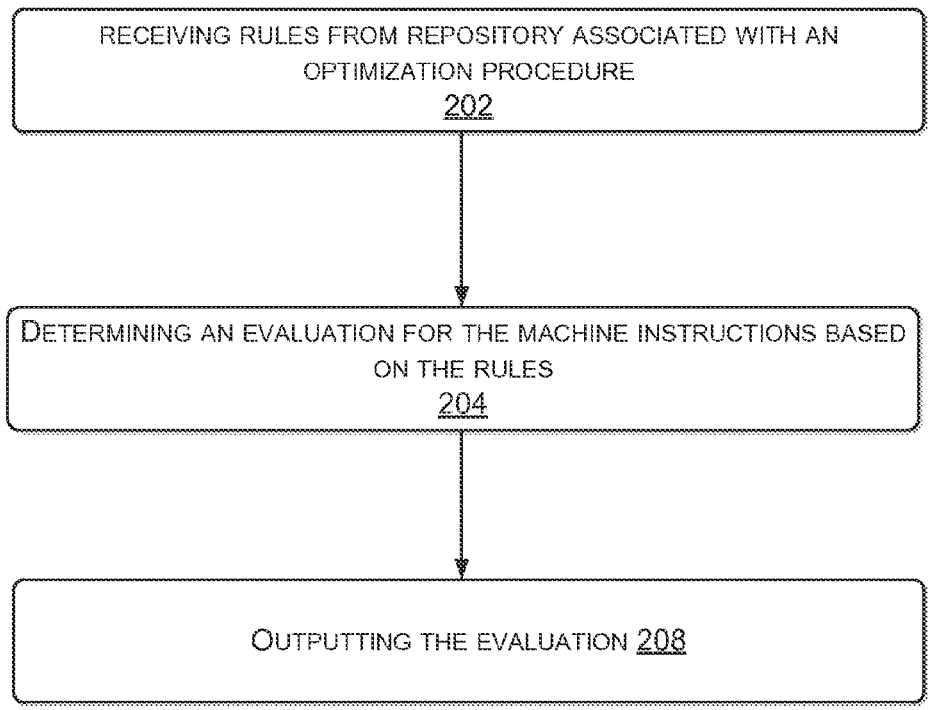
FIG. 2 is a flowchart illustrating an example method for tracking the quality and efficiency of the machine instructions for operating an associated controller, according to at least some embodiments of the disclosure.

FIG. 2 is a flow diagram indicating an exemplary method for tracking the quality and efficiency of the machine instructions for operating an associated controller. The method 200 may identify an example embodiment for tracking the quality and efficiency of machine instructions. Portions of the flow diagram may be implemented using the rules repository 120, the code analyzer module 118, or the code tracker module 116.

At operation block 202, the method 200 may receive rules from a repository associated with an optimization procedure. The method 200 may retrieve the rules from the rules repository 120. Further, the method 200 may display the rules to the user. For example, existing rules may be displayed to the user in a user interface. The user interface may display the name of each rule, a scope, and an explanation. The method 200 may determine whether there are new rules. For example, the user may provide a user input indicating a request to add a new rule. For example, the user may provide a name for the rule, a description, a scope applicability (e.g., package, class, sequence diagram, interface), and a condition defining the rule (e.g., a condition based on one or more attributes of a software element, such as the number of operations of a class or an interface, the tile number of descendants, the number of classes in a package, or any other attribute).

In operation block 204, the method 200 may determine an evaluation for the machine instructions based on the retrieved rules. The evaluation may be determined by the applicability of the rules. The method 200 may receive a user input prioritizing the rules. For example, the user may use a user interface to arrange a list of rules in an order which represents the desired priority of rules (e.g., rules placed near the top of a priority list may have a higher priority than rules placed near the bottom of a priority list). In other examples, the method 200 may receive user input specifying applicability and exclusion criteria for rule execution. For example, the user may specify one or more rules or one or more rule types to exclude from rule execution. Based on the inputted rules and priorities, the method 200 may execute an evaluation of the instructions. During the evaluation, violations may be identified.

At operation block 206, the evaluation may be outputted. The outputted evaluation may identify the instruction that is violating one of the rules. Warnings identifying these violations may also be reported to the user using a graphical user interface or other visualization and reporting techniques. The output may display suggestions or recommended machine instructions. The displayed suggestions or recommendations may be provided based on information retrieved from the rules repository. In one example, the user may provide user input to address one or more violations of the design quality rules. For example, the user may input an updated machine instruction in response to warnings about one or more detected violations of the rules. As another example, the user may provide an input to ignore a warning of a detected violation and may provide a rationale for why the violation can be ignored.

The example method shown in FIG. 2 is provided by way of example only. Numerous other operating environments, system architectures, and device configurations are possible. Further, steps may be performed in any order or omitted. Accordingly, embodiments of the present disclosure should not be construed as being limited to any particular operating environment, system architecture, or device configuration.

This written description uses examples to disclose certain embodiments of the disclosure, including the best modes, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed:

1. A method comprising:
populating a rules repository with data files containing a plurality of rules to be used when evaluating a plurality of machine instructions that are operable by a controller to control an industrial equipment;
receiving, by at least one processor, from the rules repository, the plurality of rules;
evaluating, by the at least one processor, the plurality of machine instructions using the plurality of rules, the evaluation comprising identifying a violation of one or more of the plurality of rules by one or more machine instructions of the plurality of machine instructions;
displaying, on a user interface, at least one of a warning or a suggestion that is based on identifying the violation;
receiving, via the user interface, a user input to correct the violation;
generating a recommended plurality of machine instructions based at least in part on the user input; and controlling the industrial equipment by the controller, based on communicating the recommended plurality of machine instructions to the controller.

2. The method of claim 1, further comprising: categorizing the plurality of rules into one or more categories.

3. The method of claim 1, wherein the plurality of machine instructions comprises one or more logic blocks associated with an operation procedure for the controller.

4. The method of claim 1, wherein the plurality of machine instructions comprises a plurality of input/output values associated with an operation procedure for the controller.

5. The method of claim 1, wherein the evaluation further comprises determining one or more optimized machine instructions.

6. The method of claim 1, wherein the industrial equipment is a turbine and wherein the plurality of rules are operable by the controller to control the turbine.

7. The method of claim 1, wherein the industrial equipment is a turbine and wherein the plurality of rules comprises at least one of a rule to optimize the plurality of machine instructions, a rule to improve maintainability of the plurality of machine instructions, a rule to improve reusability of the plurality of machine instructions, or a rule to improve efficiency of the plurality of machine instructions.

8. The method of claim 1, wherein the industrial equipment is a turbine and wherein the plurality of rules includes at least one of a rule to reassign an execution order of the plurality of machine instructions from a sequential order to a parallel order, or a rule to embed into a single block, one or more machine instructions that are generated using multiple blocks.

9. The method of claim 1, wherein the user input to correct the violation comprises at least one of an input to ignore the warning or an input having an updated machine instruction.

10. A system comprising:
a memory having stored thereon:
a rules repository, the rules repository containing a plurality of rules to be used when evaluating a plurality of machine instructions that are operable by a controller to control an industrial equipment;
a processor coupled to the memory, the processor configured to:
receive from the rules repository, the plurality of rules;
evaluate the plurality of machine instructions based at least in part on the plurality of rules, the evaluation comprising identifying a violation of one or more of the plurality of rules by one or more machine instructions of the plurality of machine instructions;
a user interface configured to:
display at least one of a warning or a suggestion that is based on identifying the violation; and
receive a user input to correct the violation,
the processor further configured to generate a recommended plurality of machine instructions based at least in part on the user input and communicate the recommended plurality of machine instructions to the controller to control the industrial equipment.

11. The system of claim 10, wherein each of the plurality of rules is associated with one of a plurality of categories.

12. The system of claim 10, wherein the plurality of machine instructions comprises one or more logic blocks associated with an operation procedure for the controller.

13. The system of claim 10, wherein the plurality of machine instructions comprises a plurality of input/output values associated with an operation procedure for the controller.

14. The system of claim 10, wherein the industrial equipment is a turbine and wherein the plurality of rules are operable by the controller to control the turbine.

15. The system of claim 10, wherein the industrial equipment is a turbine and wherein the plurality of rules comprises at least one of a rule to optimize the plurality of machine instructions, a rule to improve maintainability of the plurality of machine instructions, a rule to improve reusability of the plurality of machine instructions, or a rule to improve efficiency of the plurality of machine instructions.

16. The system of claim 10, wherein the industrial equipment is a turbine and wherein the plurality of rules includes at least one of a rule to reassign an execution order from sequential to parallel, or a rule to embed one or more machine instructions that are generated using multiple blocks into a single block.

17. The system of claim 10, wherein the user input to correct the violation comprises at least one of an input to ignore the warning or an input having an updated machine instruction.

18. One or more non-transitory computer-readable media storing computer-executable instructions that, when executed by at least one processor, configure the at least one processor to perform operations comprising:
populating a rules repository with a plurality of rules to be used when evaluating a plurality of machine instructions that are operable by a controller to control an industrial equipment
receiving, by a computing device, from the rules repository, the plurality of rules;
evaluating, by the computing device the plurality of machine instructions using the plurality of rules, the evaluation comprising identifying a violation of one or more of the plurality of rules by one or more machine instructions of the plurality of machine instructions;
displaying, on a user interface, at least one of a warning or a suggestion that is based on identifying the violation;
receiving, via the user interface, a user input to correct the violation;
generating a recommended plurality of machine instructions based at least in part on the user input; and
controlling the industrial equipment by the controller, based on communicating the recommended plurality of machine instructions to the controller.

19. The non-transitory computer-readable media of claim 18, wherein the evaluation further comprises determining one or more optimized machine instructions.

\* \* \* \* \*